(12) United States Patent
Ramseier et al.

(10) Patent No.: US 11,434,084 B2
(45) Date of Patent: Sep. 6, 2022

(54) METHOD AND DEVICE FOR OPENING A TRANSPORT BAG

(71) Applicant: FERAG AG, Hinwil (CH)

(72) Inventors: Marcel Ramseier, Wetzikon (CH); Erwin Stauber, Grüt (CH); Martin Keller, Turbenthal (CH)

(73) Assignee: FERAG AG, Hinwil (CH)

(*) Notice: Subject to any disclaimer, the term of this patent is extended or adjusted under 35 U.S.C. 154(b) by 663 days.

(21) Appl. No.: 16/341,828

(22) PCT Filed: Oct. 27, 2017

(86) PCT No.: PCT/EP2017/077603
§ 371 (c)(1),
(2) Date: Apr. 12, 2019

(87) PCT Pub. No.: WO2018/078098
PCT Pub. Date: May 3, 2018

(65) Prior Publication Data
US 2021/0395022 A1    Dec. 23, 2021

(30) Foreign Application Priority Data

Oct. 27, 2016 (CH) .......................................... 1438/16
Nov. 23, 2016 (WO) ................ PCT/CH2016/000146
(Continued)

(51) Int. Cl.
*B65G 47/61* (2006.01)
*B65G 17/18* (2006.01)
(Continued)

(52) U.S. Cl.
CPC .............. *B65G 47/61* (2013.01); *B65B 43/32* (2013.01); *B65G 17/18* (2013.01); *B65G 17/32* (2013.01);
(Continued)

(58) Field of Classification Search
None
See application file for complete search history.

(56) References Cited

U.S. PATENT DOCUMENTS

| 1,994,782 A | 3/1935 | Olson |
| 3,357,539 A | 12/1967 | Naslund |

(Continued)

FOREIGN PATENT DOCUMENTS

| CH | 710650 A1 | 7/2016 |
| CH | 109/17 | 1/2017 |

(Continued)

OTHER PUBLICATIONS

Swiss Federal Institute of Intellectual Property, Swiss Search Report for CH 01438/16, dated Dec. 28, 2016, in the German language (2 pages).
(Continued)

*Primary Examiner* — Kavel Singh
(74) *Attorney, Agent, or Firm* — Pauley Erickson & Swanson

(57) ABSTRACT

A method and a device for opening a transport bag for loading and/or unloading, wherein the transport bag is conveyed along a conveying path by a conveyor system, in a suspended manner, to a device for opening the transport bag. The transport bag has a front and rear wall and a movable push element, which effects a relative movement of the front and rear wall with respect to one another between a closed bag state and an open bag state. An actively moved push device exerts a pushing force on a first end of the push element of the transport bag and the push element is converted from an idle conformation into a conformation subjected to a pushing force. The front and rear wall are thus
(Continued)

moved relative to one another in the direction of an open bag state and the transport bag is opened for loading and/or unloading.

24 Claims, 10 Drawing Sheets

(30) Foreign Application Priority Data

| | | | |
|---|---|---|---|
| Jan. 31, 2017 | (CH) | | 109/17 |
| Jan. 31, 2017 | (CH) | | 110/17 |
| May 5, 2017 | (CH) | | 607/17 |
| May 24, 2017 | (CH) | | 684/17 |
| Jun. 20, 2017 | (CH) | | 796/17 |

(51) Int. Cl.
  *B65G 17/32* (2006.01)
  *B65G 43/10* (2006.01)
  *B65G 19/00* (2006.01)
  *B65B 43/32* (2006.01)

(52) U.S. Cl.
  CPC ........ *B65G 43/10* (2013.01); *B65G 2811/095* (2013.01)

(56) References Cited

U.S. PATENT DOCUMENTS

| | | | | |
|---|---|---|---|---|
| 8,490,774 | B2* | 7/2013 | Janzen | B65G 9/002 53/251 |
| 8,607,963 | B2* | 12/2013 | Wend | B65G 19/025 198/474.1 |
| 8,720,667 | B2* | 5/2014 | Koga | B65B 51/32 198/430 |

FOREIGN PATENT DOCUMENTS

| | | |
|---|---|---|
| CH | 110/17 | 1/2017 |
| CH | 711565 A1 | 3/2017 |
| DE | 397192 C | 6/1924 |
| DE | 826 270 C | 12/1951 |
| DE | 1 116 156 B | 10/1961 |
| DE | 1 175 153 B | 7/1964 |
| DE | 195 04 879 A1 | 8/1996 |
| DE | 199 18 116 C1 | 7/2000 |
| DE | 103 54 419 A1 | 6/2005 |
| DE | 10 2004 018 569 A1 | 11/2005 |
| DE | 10 2008 061 685 A1 | 6/2010 |
| DE | 10 2010 053 590 A1 | 6/2012 |
| DE | 20 2012 012 331 U1 | 1/2013 |
| DE | 10 2012 018 925 A1 | 3/2014 |
| DE | 10 2012 108 757 A1 | 3/2014 |
| DE | 10 2014 203 298 A1 | 8/2015 |
| DE | 10 2015 208 393 A1 | 11/2016 |
| EP | 1 420 105 A1 | 5/2004 |
| EP | 1 420 106 A1 | 5/2004 |
| EP | 2 196 415 A2 | 6/2010 |
| EP | 2 380 829 A2 | 10/2011 |
| EP | 2 418 160 A1 | 2/2012 |
| EP | 2 620 394 A1 | 7/2013 |
| EP | 2 792 620 A1 | 10/2014 |
| EP | 3 028 961 A1 | 6/2016 |
| WO | WO 01/81217 A1 | 11/2001 |
| WO | WO 2014/044601 A1 | 3/2014 |
| WO | WO 2016/030275 | 3/2016 |
| WO | WO 2017/088076 A1 | 6/2017 |
| WO | WO 2017/088077 A1 | 6/2017 |

OTHER PUBLICATIONS

European Patent Office, International Search Report, Form PCT/ISA/210 for International Application PCT/CH2016/000146, dated Feb. 24, 2017, in the German language (3 pages).

Swiss Federal Institute of Intellectual Property, Swiss Search Report for CH 00109/17, dated May 3, 2017, in the German language (2 pages).

Swiss Federal Institute of Intellectual Property. Swiss Search Report for CH 00110/17, dated Apr. 19, 2017, in the German language (2 pages).

Swiss Federal Institute of Intellectual Property, Swiss Search Report for CH 00607/17, dated Aug. 2, 2017, in the German language (2 pages).

Swiss Federal Institute of Intellectual Property, Swiss Search Report for CH 00684/17, dated Jul. 31, 2017, in the German language (2 pages).

* cited by examiner

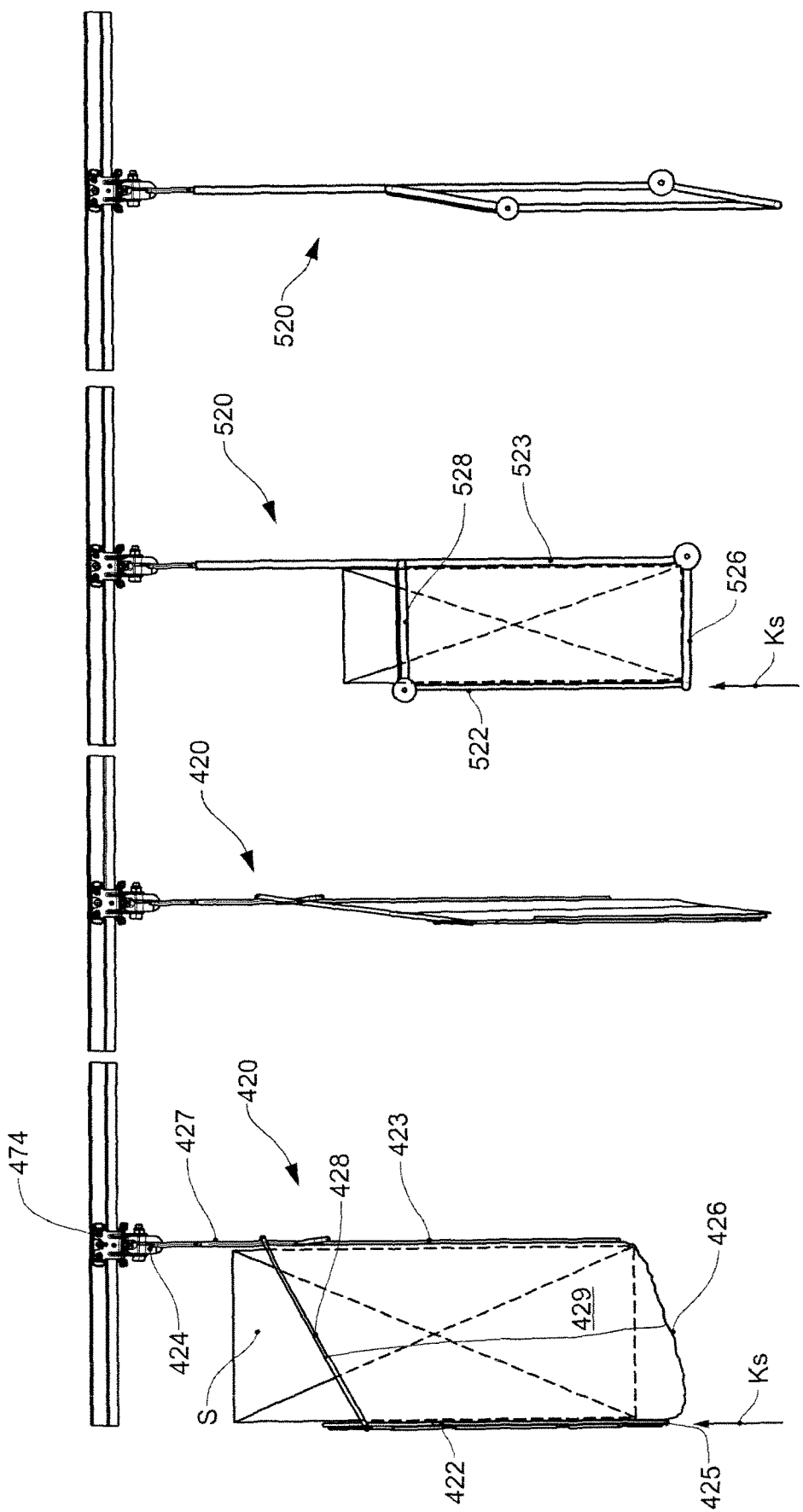

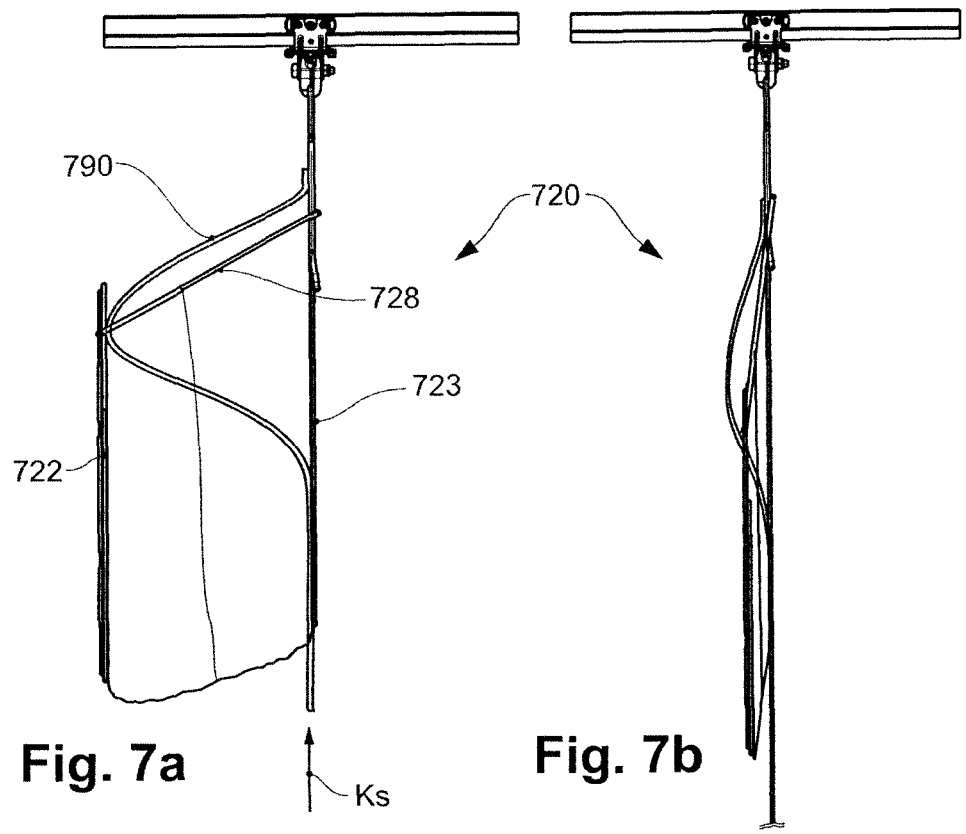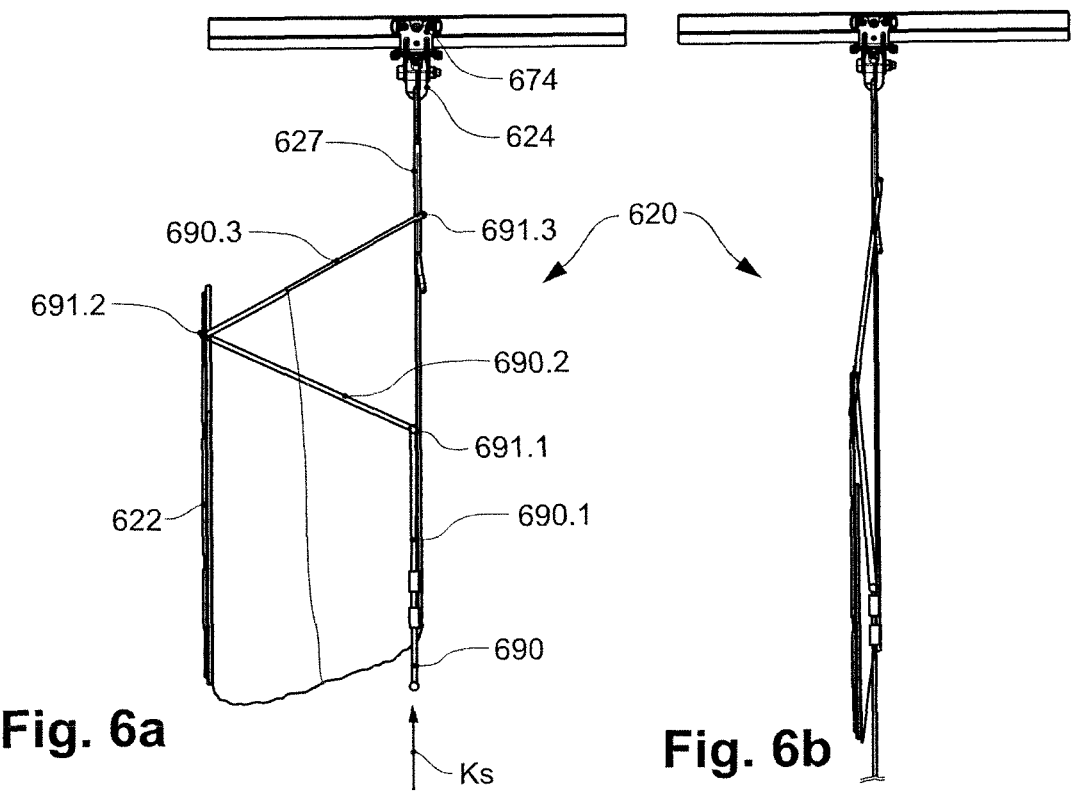

METHOD AND DEVICE FOR OPENING A TRANSPORT BAG

BACKGROUND OF THE INVENTION

Field of the Invention

The present invention relates to the field of transporting and conveying technology. It concerns a method and a device for opening a transport bag for loading and/or unloading according to the preambles of claims 1 and 7, and a transport bag for such a device according to the preamble of claim 21.

Discussion of Related Art

It is known from the prior art that overhead conveyor systems having a multiplicity of transport bags are used as efficient means for transporting, sorting, buffering or temporarily storing different types of articles in automated warehouses, wide-ranging production facilities and, quite generally, when conveying and transporting articles.

Overhead conveyor systems can be realized as transport chain arrangements, in which a plurality of conveyor elements form links of a chain which is moved along a conveying path. Likewise known are gravity-driven conveyor systems, in which conveyor elements which are individually fitted with wheels move on corresponding running rails. Such a gravity-type, rail-guided conveyor system is known from WO 2016/030275 by the applicant. Overhead conveyor systems with transport elements are particularly suitable for efficiently conveying piece goods articles, for example workpieces in production processes, replacement parts, consumer goods such as books, clothing, shoes, etc.

Therefore, in logistics centers of mail order firms, for example, overhead conveyor systems can be used for storing a multiplicity of articles of different sizes and weight and picking groups of items according to the respective customer orders and preparing these items for dispatch.

An aspect which is relevant to an overhead conveyor system in this case is the simple, smooth and efficient introduction of articles into transport elements and removal of the articles from the transport elements.

Although manual removal of the articles from the transport bags enables flexible handling of different articles, it is slow and cost-intensive.

DE102012018925A1 discloses an overhead bag conveyor arrangement, in which bags are conveyed along a guide rail, wherein they are suspended vertically below the guide rail in the transport position and are aligned substantially horizontally in a loading position. The bags have hooks for the pivotable suspension of the bags on the guide rail of the overhead conveyor and a rear side with wing regions protruding laterally in relation to the front side. As the bags enter the loading station, the wing regions strike rigid guide rails, which aid in rotating them out of the vertical transport position into a horizontal loading position. Upon the rotation into the horizontal loading position, the bag opens, driven by gravity, and can be loaded via the open sides or the open cover. The bags are necessarily either in the vertical closed position or in the horizontal open position.

There is a general need for advancements within this field of technology.

SUMMARY OF THE INVENTION

An object of the present invention is therefore to provide a method for opening a transport bag for loading and/or unloading which enables the loading and unloading to be realized more efficiently and more flexibly.

Further objects of the present invention consist in specifying a device for opening transport bags which are conveyed along a conveying path in a conveying system, in particular in a suspended manner, and corresponding transport bags.

These and further objects are achieved by the method and devices defined in the independent claims 1 and 7 and the transport bag defined in the independent claim 21.

Further advantageous embodiments are each revealed in the dependent claims.

In the method according to the invention for opening a transport bag for loading and/or unloading, the transport bag is conveyed along a conveying path by a conveyor system, in particular in a suspended manner, to a device for opening the transport bag. The transport bag has a front wall and a rear wall and is equipped with a movable push element, which effects a relative movement of the front wall and the rear wall with respect to one another between a closed bag state and an open bag state. In this case, by means of an actively moved push device, a pushing force is exerted on a first end of the push element of the transport bag and the push element is converted from an idle conformation into a conformation subjected to a pushing force so that the front wall and the rear wall are moved relative to one another in the direction of an open bag state, whereby the transport bag is in turn opened for loading and/or unloading.

The transport bag is preferably held on the conveyor system in such a way that the conveyor system forms a counter bearing with respect to the pushing force exerted by the push device. A second end of the push element acts on this counter bearing.

The push element according to the invention is substantially longitudinally stable so that the application of the pushing force to the one end does not result in a shortening of the push element, but this is instead deflected from an idle conformation. This deflection movement is used to fully or partially open the transport bag.

Owing to the application of the pushing force, the distance between the first end of the push element and the second end of the push element, which acts on the counter bearing, is preferably reduced. In this case, the longitudinally stable push element is converted into a conformation subjected to a pushing force and thereby moves the front wall and the rear wall relative to one another in the direction of the open bag state.

According to a preferred embodiment, with the aid of the actively movable and controllable push device, the transport bag can be held in an open bag state for a time required for loading and/or unloading. This time can be determined by a control device.

In this case, the opening time and width is dependent on the conveying speed of the bags, the movement speed of the push device and the movement path thereof.

The transport bag can remain idle in an open bag state during loading and/or unloading or it can be conveyed further by the conveyor device, wherein, in the second case, the push device is moved with it accordingly. In the case of a moving bag, to open the bag accordingly, the push device is moved more quickly than the bag and, to hold it open, it is preferably moved with the same speed and direction as the bag. The movement vector of the push element can deviate from the vector of the desired movement of the first end of the push device on the bag. It is merely vital that the movement of the push device is controlled in such a way that it results in the desired movement of the push element.

According to a preferred embodiment of the invention, the transport bag, which is supplied in a suspended manner, is opened by the push device and, before, during or after this, is pivoted from the suspended position into a delivery position.

The device according to the invention for opening transport bags conveyed along a conveying path in a conveyor system, in particular in a suspended manner, comprises an actively movable push device and at least one transport bag with an opening at the upper side. The transport bag has a base, a front wall and a rear wall and a push element connecting the two walls. The push element has a first end for the action of a push device and a second end, which acts on a counter bearing formed by the conveyor system, so that, upon the application of a pushing force exerted by the push device on the first end of the push element, a relative movement of the front wall and the rear wall with respect to one another between a closed bag state and an open bag state is affected.

According to a preferred embodiment of the invention, the push element is longitudinally stable and preferably comprises at least one jointed rod with at least one torque joint, or at least one flexible pole or link chain which is stable under pushing.

The push element preferably comprises at least two jointed rods in a parallelogram shape, which are connected to one another in a jointed manner, or at least one push rod with two torque joints.

According to further embodiments, the flexible pole or link chain, which is stable under pushing, is axially movably guided in a channel, wherein this has at least one break so that, upon the application of a pushing force, a deflection of the push element in the region of the break in the channel results in the relative movement of the front wall and the rear wall with respect to one another and therefore in the opening of the bag.

The push element is preferably arranged laterally on the transport bag, preferably on both sides. The lateral arrangement is advantageous in particular in the region of the upper bag opening since it enables unhindered loading and unloading via the upper bag opening. If the bag is loaded and/or unloaded from the side, unhindered access to the upper side is not important and the push element can also extend centrally over the upper side.

The first end of the push element is preferably formed as a push edge. This is not only the case when this first end of the push element is formed by a lower edge of a front or rear side of the bag, which is stable under pushing, but also in bags made from textile or foil material which are stabilized by a wire or plastics frame.

According to further preferred embodiments, the push element comprises portions of the front and/or rear wall which are stable under pushing.

The portions of the front and rear wall which are stable under pushing are preferably connected to one another by a pivotally movable spacer. In this case, the pivotally movable spacer is particularly preferably arranged in the region of the upper bag opening and, in preferred embodiments, forms a frame around the bag opening.

In further embodiments of the invention, the push device has a pusher cooperating with the first end of the push element. The pusher of the push device is actively moved by a drive device.

The pusher preferably comprises a push plate, a push rib and/or one or more push fingers.

According to preferred embodiments of the invention, a control device is provided for adapting the conveying speed of the transport bag conveyed by means of the conveyor system and the speed of the pushing movement of the actively moved push device to one another so that the opening width and duration of the transport bag can be individually determined.

The device for opening the bag preferably comprises a feed device for feeding goods into the open transport bag.

In preferred embodiments, the push device comprises a revolving conveyor belt with a plurality of pushers arranged thereon.

In this case, the direction of extent of the conveyor belt is adapted to the direction of extent of the conveyor system in such a way that the transport bag is pivoted into a delivery position during the opening procedure.

The transport bag according to the invention has a front wall and a rear wall and is equipped with a movable push element. The push element in turn has a first end for the action of a push device and a second end, which acts on a counter bearing formed by the conveyor system, so that, upon the application of a pushing force exerted by a push device on the first end of the push element, a relative movement of the front wall and the rear wall with respect to one another between a closed bag state and an open bag state can be effected.

The push element of the transport bag preferably comprises a carrying portion for attachment to a conveyor element of the conveyor system in a manner which is stable under pushing.

The introduction of the pushing force preferably takes place via a bag wall which is stable under pushing, particularly preferably via a lower edge of such a bag wall.

According to preferred embodiments, the bag walls, which are stable under pushing, are manufactured from plastics hollow profile plates.

The transport bags of one of the above-mentioned devices advantageously comprise a rear and front wall, which are stable under pushing, wherein the base portion can be configured to be flexible or rigid. In the case of a rigid base plate, a jointed connection to the rear and front wall is provided to ensure the movability between the open and the closed bag state.

The rear and front wall and all further rigid walls are preferably movable with respect to one another, and the flexible further bag walls are preferably flexible, in such a way that, in the vertically suspended state in which they are not subjected to a force, they form a collapsed, closed bag in a manner driven by gravity.

According to further embodiments, individual joints of the push element can be configured to be lockable in order to also hold the bag in an open state against gravity and without a force effect by the push device.

The rear wall of the transport bag is particularly advantageously extended upward beyond the height of the front wall with a carrying portion for the attachment of the transport bag to the conveyor element.

According to a preferred embodiment, the counter bearing for supporting the bag is formed as a closed or closable carrying eye in which a likewise closed or closeable suspension eye of the bag is mounted in a suspended manner. The carrying eye is preferably associated with the conveyor element.

The carrying eye particularly preferably comprises a lug which delimits the movement of the suspension eye in the direction of the second end of the push element and locks the suspension eye in the pushing direction.

BRIEF DESCRIPTION OF SEVERAL VIEWS OF THE DRAWINGS

Aspects of the invention are explained in more detail with reference to the exemplary embodiments shown in the following figures and the associated description. The figures show:

FIG. 4a a further embodiment of a transport bag in a side view in the filled state;

FIG. 4b the transport bag according to FIG. 4a in the empty, closed state;

FIG. 5a a further embodiment of a transport bag in a side view in the filled state;

FIG. 5b the transport bag according to FIG. 5a in the empty, closed state;

FIG. 6a a further embodiment of a transport bag in a side view in the filled state;

FIG. 6b the transport bag according to FIG. 6a in the empty, closed state;

FIG. 7a a further embodiment of a transport bag in a side view in the open state;

FIG. 7b the transport bag according to FIG. 7a in the empty, closed state;

DETAILED DESCRIPTION OF THE INVENTION

Figure 1A:
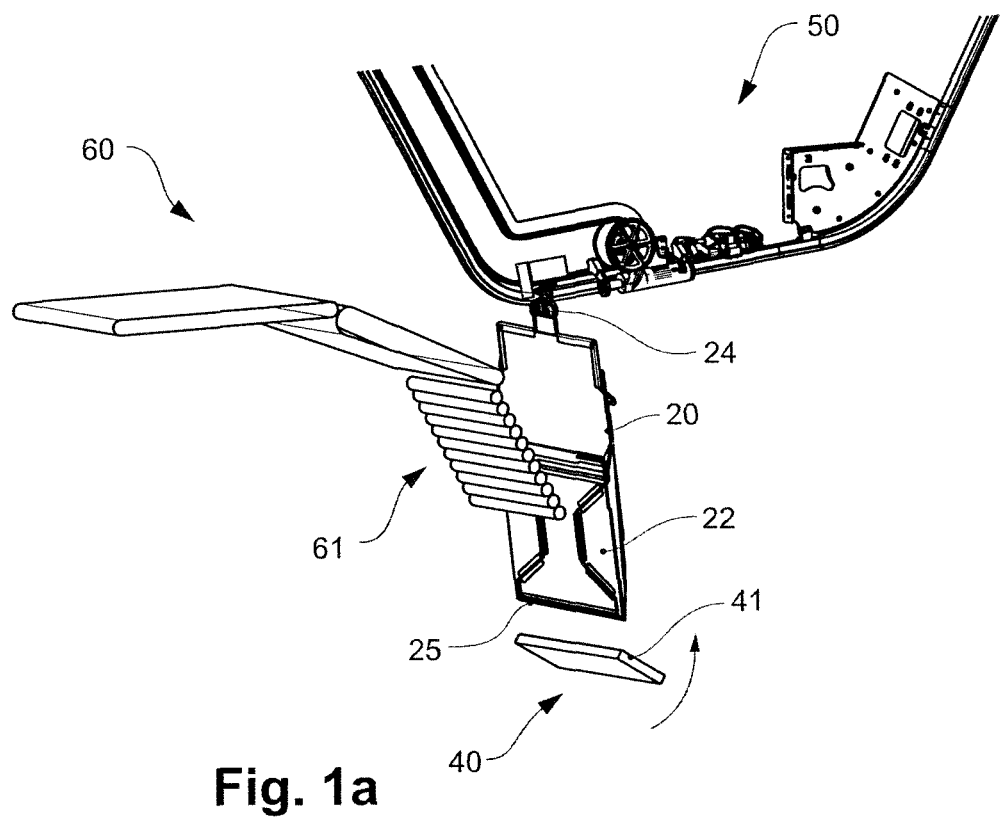
FIG. 1a a perspective side view of a device for opening transport bags according to an embodiment of the invention with a partially illustrated conveyor system and transport bags conveyed along the conveying path in a suspended manner, wherein the actively moved push device is illustrated schematically as a pivotally movably arranged push plate and the still-closed transport bag is conveyed in the direction of a feed device.

FIG. 1 shows an opening device according to a first configuration of the invention, in which an empty, closed transport bag supplied to the opening device can be opened by means of a push device 40 formed in a pivotally movable manner. In the illustrated exemplary embodiment, the conveyor system 50 for conveying transport bags 20 in a suspended manner is said to be a gravity-type overhead conveyor arrangement, although it can also be configured as a conveyor system based on a transport chain conveyor. The transport bag comprises a push element of the type described in detail below with reference to FIGS. 4 and 9. The lower edge 25 of the front bag wall 22 is part of the push element. The push element, illustrated schematically as a push plate, acts on the lower edge of the front bag wall in that the push plate is pivoted upward against the lower edge of the bag front wall 22.

With an idle transport element, the pushing movement of the push plate 41 is converted by means of the longitudinally stable push element of the transport bag into an opening movement of the bag as soon as the push plate strikes the lower edge of the front wall.

Figure 1B:
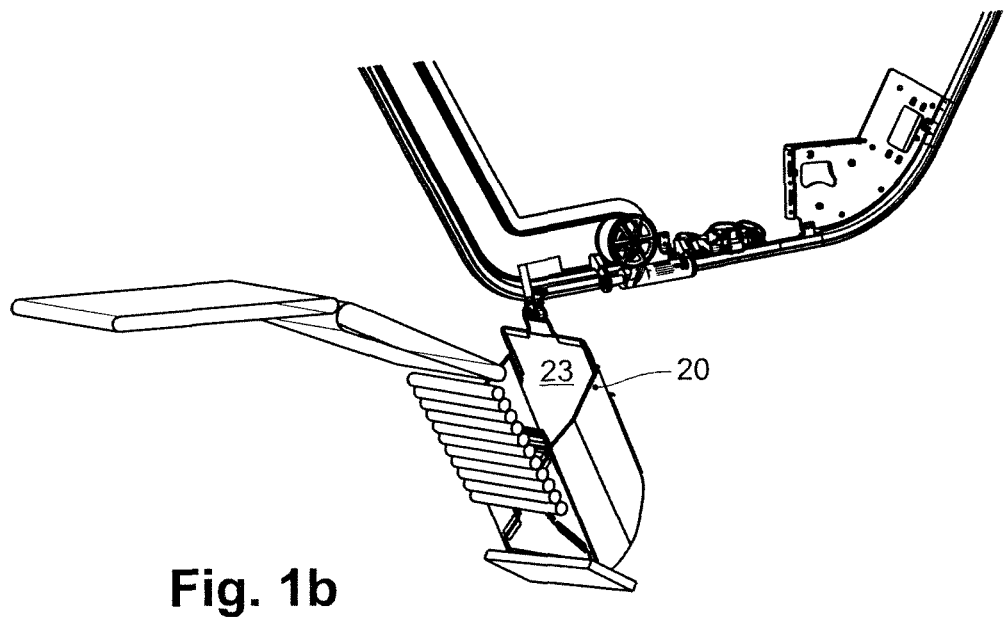
FIG. 1b the device according to FIG. 1a, in which the transport bag is held open against the feed device by the push plate.

Whilst, in FIG. 1a, the closed bag is illustrated before the contact with the push plate, it is already located in the open state in FIG. 1b. The push plate 41 has reached an upper pivotal position and opens the bag with the aid of the push element, which comprises the bag front and rear wall 22 and 23 and the pivotally movably arranged spacer. Serving as a counter bearing for this movement is the suspension eye 24, by means of which the transport bag is pivotally mounted on the conveyor system. In the open state illustrated in FIG. 1b, the front bag wall lies against a roller mat 61 of a loading station 60 so that the open bag can be filled with articles and piece goods supplied via the likewise illustrated conveyor belts.

Figure 2:
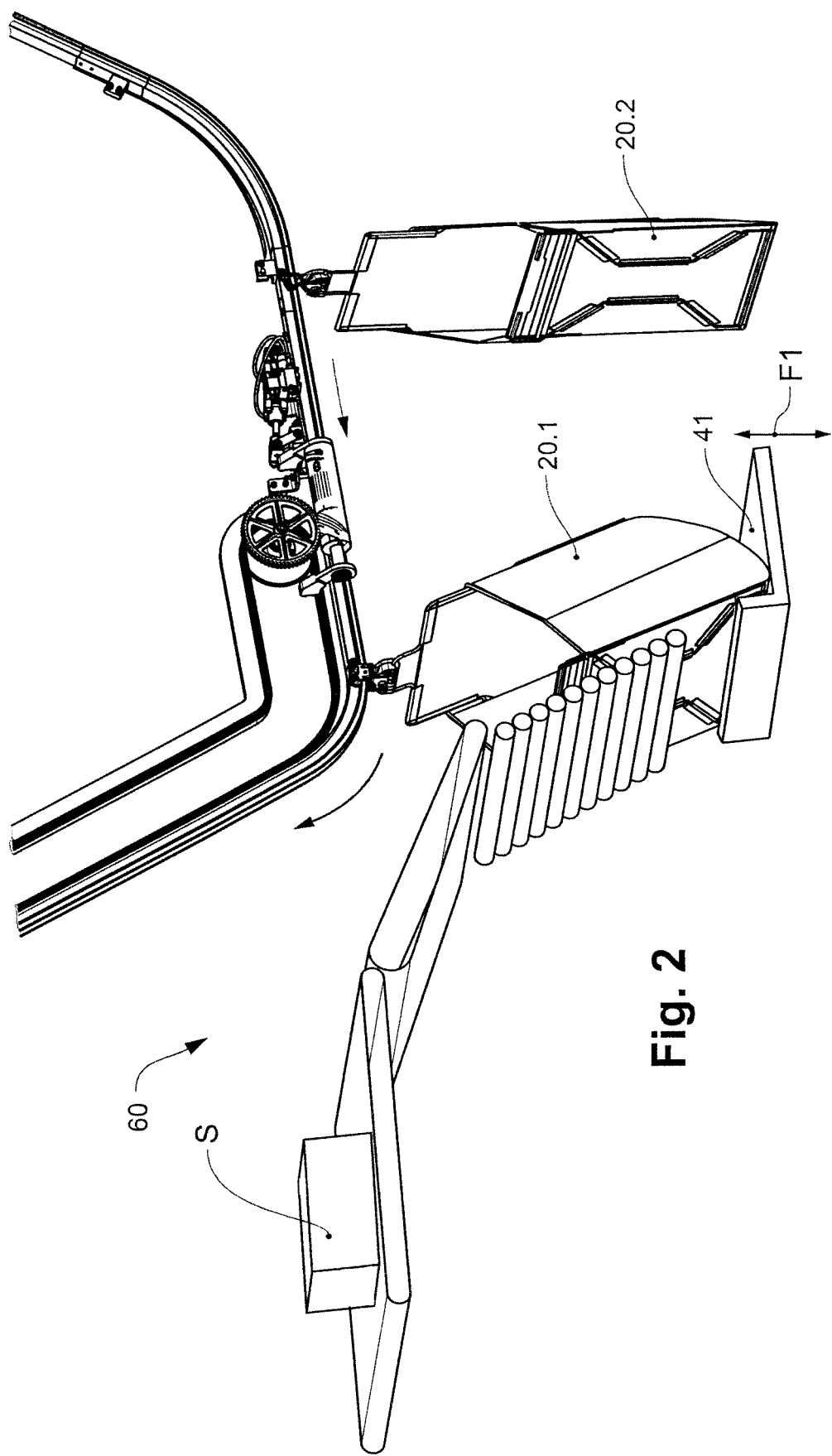
FIG. 2 a further configuration of the device for opening transport bags, in which a push element, which can be moved linearly up and down, holds a first transport bag in an open state and a following second transport bag is still located in the closed state.

FIG. 2 shows a further configuration of the device for opening transport bags, in which a push device, which can be moved linearly up and down, holds a first leading transport bag 20.1 in an open state and a following second transport bag 20.2 is still located in the closed state. In terms of distance and speed, the pushing movement F1 of the push device is adapted to the transport speed of the bag such that the transport bag is dynamically opened. This means that the bag is not stationary during the opening and subsequent filling procedures, but is transported further and, in a manner adapted to the transport speed, held in the open state by the push device. As already described and illustrated in FIG. 1, piece goods S can be delivered into the open transport bags 20 by means of a loading station 60.

The transport bags illustrated in FIG. 2 in turn correspond to the bags which have already been illustrated and described in the embodiment according to FIG. 1.

Figure 3:
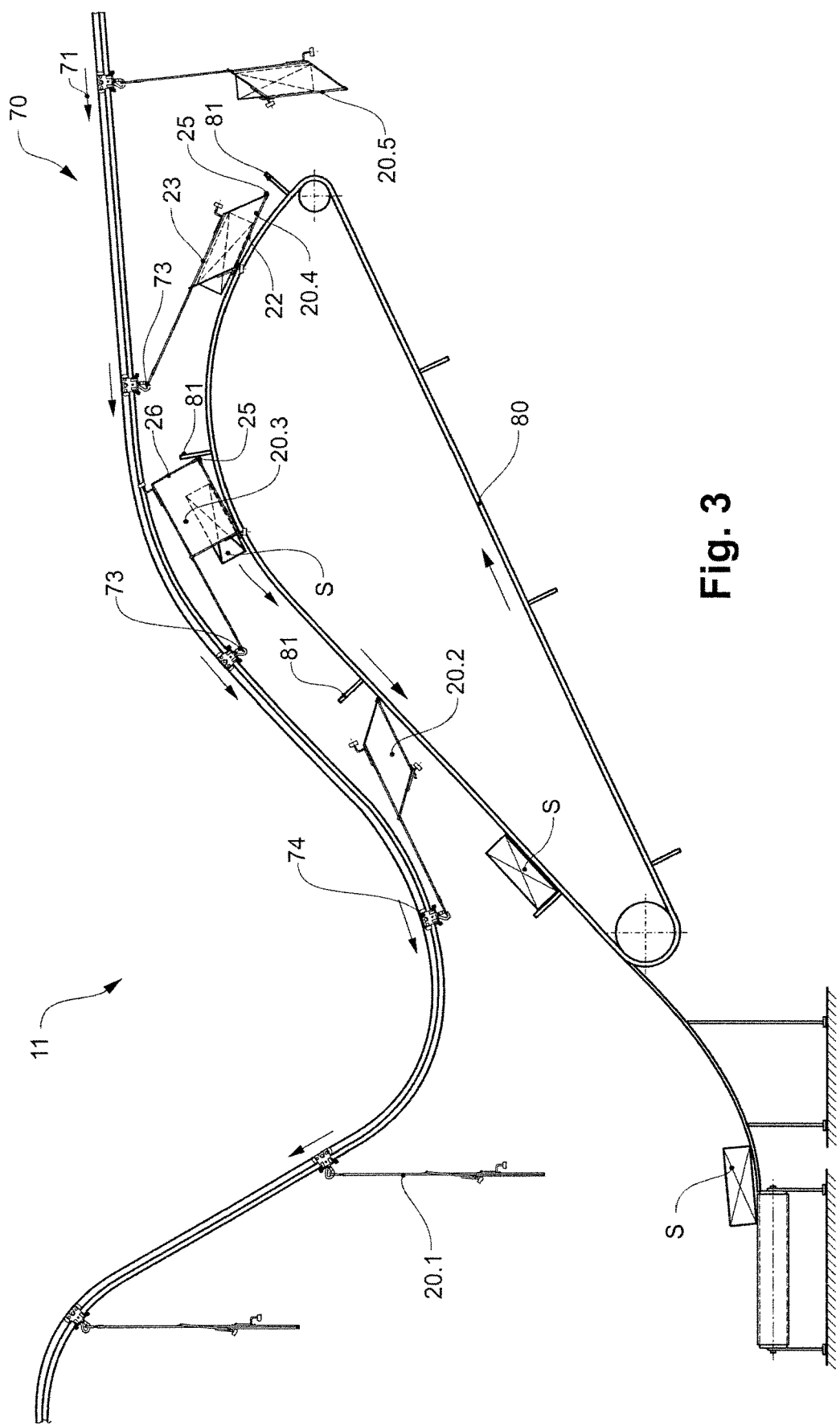
FIG. 3 a schematic side view of a further embodiment of a device for opening transport bags, in which supplied transport bags filled by a partially illustrated conveyor system are opened for emptying purposes by push ribs, which are arranged on a revolving conveyor belt.

In further embodiments which are not illustrated, other types of transport bag are used in the devices according to FIGS. 1 to 3. In push devices according to FIG. 1, it has proven advantageous to introduce the pushing force in the region of a lower edge of the bag front wall. Accordingly, the transport bags used here are preferably those in which the lower end of the push element lies in the region of the lower edge of the bag front wall.

In push devices according to FIG. 2, with push plates 41 which can be moved linearly up and down, different transport bags can be used, irrespective of whether the lower end of the push element is arranged on or below the bag front wall or the bag rear wall or in a region in between.

FIG. 3 shows a further embodiment of an opening device, as is disclosed in the Swiss patent application CH0109/17 by the applicant, to which reference is made herein.

A device 11 for opening and emptying transport bags 20 conveyed in a suspended manner is illustrated in a side view. Transport bags 20.3-20.5 filled with piece goods S are illustrated in different states of the continuous overall process of the opening procedure.

The different procedures during the operation of the device are explained below. The device 11 enables the automated opening and subsequent emptying of transport bags 20 in a continuous operation, and the transfer of the removed piece goods articles S for further processing.

The illustrated opening device 11 is integrated in a conveyor system 70 for conveying transport bags 20 in a suspended manner. Such a conveyor system can be configured as a transport chain conveyor or as a gravity-type overhead conveyor arrangement. The function thereof is explained in CH0109/17, to which reference is made herein.

The conveying path of the conveyor system 70 extends in the conveying direction 71 from right to left. A conveyor belt 80 revolving anti-clockwise is arranged below the conveyor system 70, on which conveyor belt transverse push ribs 81 are arranged at regular distances along the circumference.

In a first step, a supplied transport bag 20.4 is pivoted out of the vertical by the conveyor belt 80. The speed of the conveyor belt 80 is adapted to the conveying speed in such a way that the following rib 81 runs onto a lower edge 25 of the bag front wall 22 and pushes against this in the direction of revolution and the bag is thus opened. In this case, the relative speed of the rib 81 is greater than the conveying speed of a conveyor element of the conveyor system 70 so that the distance from the lower edge 25 of the bag front wall to the counter bearing formed by a carrying hook 73 of the conveyor element is reduced.

The pushing movement is converted into an opening movement of the bag by the longitudinally stable push element of the transport bag.

The relative phase displacement of the ribs 81 in relation to the carriage is selected such that a rib runs behind the transport bag 20 in the contact portion and, in this case, slowly catches up with the transport bag 20 until the rib finally reaches the front edge 25 at the base portion 26. In this region, the rib moves horizontally more quickly than the transport bag whereof the carriage has already reached a region with an increasing incline. The rib 81 now pushes the front wall of the bag 20 forward, so that the distance between the front wall 22 and rear wall 23 increases and the transport bag 20 finally assumes an open state in which it can be passively emptied, driven by gravity.

A piece goods item S present in the transport bag begins to slide out of the transport bag 20 down the conveyor belt 80 until it finally reaches the transverse rib 81 ahead and is stopped by this and is conveyed further, controlled by the belt.

The empty transport bag 20 then lifts off the conveyor belt 80, pivots back into the freely suspended vertical position, whereby it closes, driven by gravity, since the push rib 81 no longer exerts a pushing force on the push element.

With regard to further details relating to the conveyor belt 80, the configuration of the transverse ribs 81, the general construction and the control of the conveyor system and the device for opening and emptying the transport bags, please refer here to CH 0109/17.

The basic principle of the push element will be explained in more detail below with reference to different embodiments of bags according to the invention.

In FIG. 4a, a transport bag 420 filled with piece goods or a package S is illustrated, which has a stable front wall 422 and a stable rear wall 423. The rear wall, which is stable under pushing, has an extended upper region 427 which, at its end, ends in a suspension eye 424 which is pivotally mounted on a carriage 474.

The push element of the transport bag 420 comprises the front and rear walls, 422, 423, which are stable under pushing, and two laterally arranged spacers 428 connecting them in a pivotally movable manner.

Since the spacers are also stable under pushing, upon the application of a pushing force $K_s$ from below to the lower edge 425 of the bag front wall 422 of a closed bag by means of a push device, which is not illustrated in FIG. 4b, this necessarily causes a pivotal movement of the spacer 428 in relation to the stable bag walls. The pivotal movement results in a relative movement of the bag walls and an increase in the distance between them, at least in the region of the spacer, i.e. in the region of the bag opening.

In the illustrated exemplary embodiment, the lateral bag walls 429 and the base 426 are manufactured from a flexible textile or mesh material which is stable under tension and does not oppose the movement of the push element with any notable resistance until they are subjected to a tensile load.

In the embodiment according to FIG. 5, a transport bag 20 is illustrated, in which front and rear walls 522, 523, which are stable under pushing, are connected to one another by two laterally arranged spacers 528 connecting them in a pivotally movable manner and a pivotally movably arranged stable base 526. In FIG. 5b, the gravity-driven closed state of an empty bag is in turn illustrated. The front wall 522 can be elevated by pushing from below (pushing force $K_s$). The parallelogram construction, which comprises front and rear walls 522, 523, spacer 528 and base 526 and is stable under pushing, in turn results in the opening of the transport bag 520.

In FIG. 6, a further embodiment of a transport bag 620 according to the invention is illustrated, in which the push element comprises two push rods 690 which are arranged on both sides of the bag and each have three torque joints 691.1, 691.2, 691.3. In the illustrated embodiment, the point of action for the pushing force is now located on the bag rear wall 623. A first lower portion of the push rod is axially movably guided on the outer edge of the bag rear wall in two lugs. By pushing from below (application of the pushing force $K_s$ at the lower edge of the push rod), the axial pushing movement of the first portion 690.1 of the push rod is transferred via the first joint 691.1 to a second portion of the push rod 690.2, which, by means of an upper end, acts on the third portion of the push rod 690.3 in a jointed manner and pivotally movably on the bag front wall 622. The third push rod portion 690.3 can also be formed as a spacer. It is in turn pivotally mounted with its upper end on the extended upper region 627 of the bag rear wall, which terminates in a suspension eye 624 is mounted on the carriage 674. Owing to the application of the pushing force, the bag front wall is moved away from the rear wall and the bag opens.

In the embodiment according to FIG. 7, the push element comprises a flexible pole 790, which is stable under pushing and, like the push rod in FIG. 6, is guided laterally on the bag rear wall 723 and attached to the bag front wall 722 in a central region. If the lower end of the flexible pole is pushed upwards, the bag opens since the front and rear wall are moved apart.

In the illustrated exemplary embodiment, the bag front and rear wall are still additionally connected to one another by a pivotally movably arranged spacer 728. This stabilizes the relative movement of the two walls with respect to one another and prevents uncontrolled tilting of the walls during the opening and closing procedures.

In further embodiments, which are not illustrated in the figures, it is possible to dispense with the spacer.

Figures 8A, 8B:
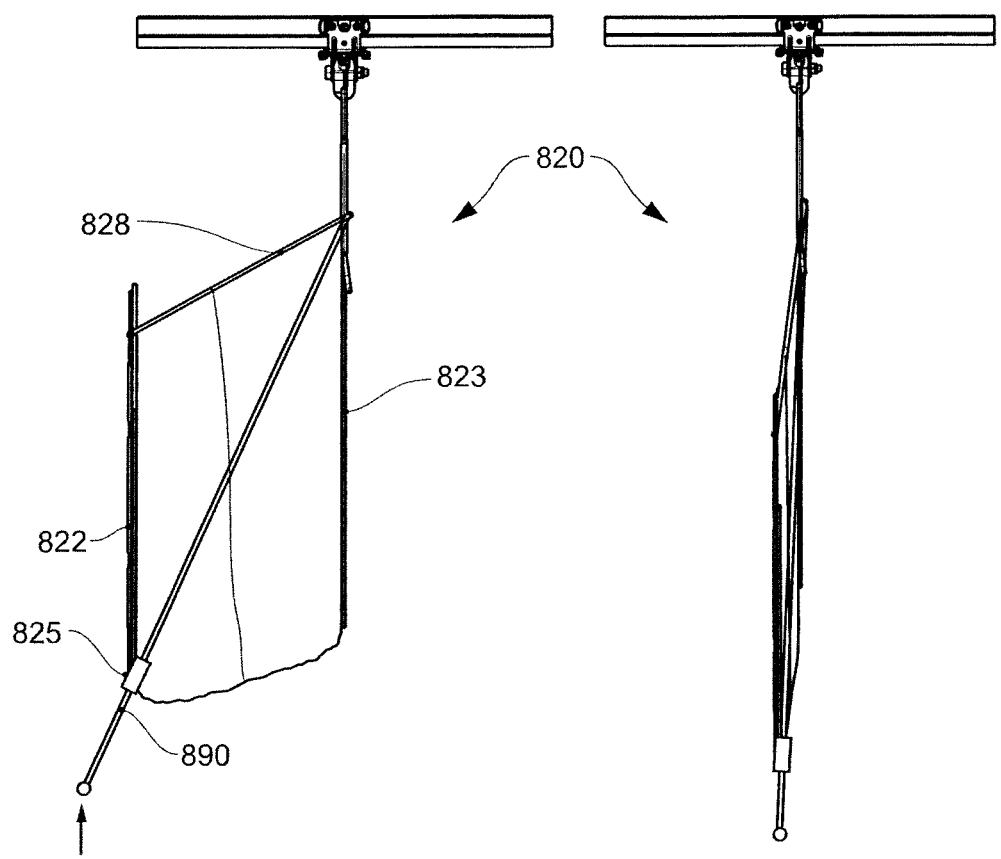
FIG. 8a a further embodiment of a transport bag in a side view in the open state.
FIG. 8b the transport bag according to FIG. 8a in the empty, closed state.

In the embodiment of the transport bag 820 according to FIG. 8, the points of action for the push device are provided on extended levers 890 arranged laterally on the bag. A guide sleeve 825, in which the lever 890 is displaceably guided, is arranged at the lower edge of the bag front side. Whilst the lower end of the lever 890 lies freely, the opposite upper end is pivotably movably mounted on the bag rear wall 823. If the pushing force is applied to a lower end of the lever 890 and this lower end is elevated, the bag front wall 822 is also elevated and is moved away from the rear wall 823 by means of the spacer 828 and the bag is opened. Since the lever 890 projects downward and forward over the bag front wall 822, it can be reached particularly easily by the push device, wherein the bag base remains free.

Figures 9A, 9B:
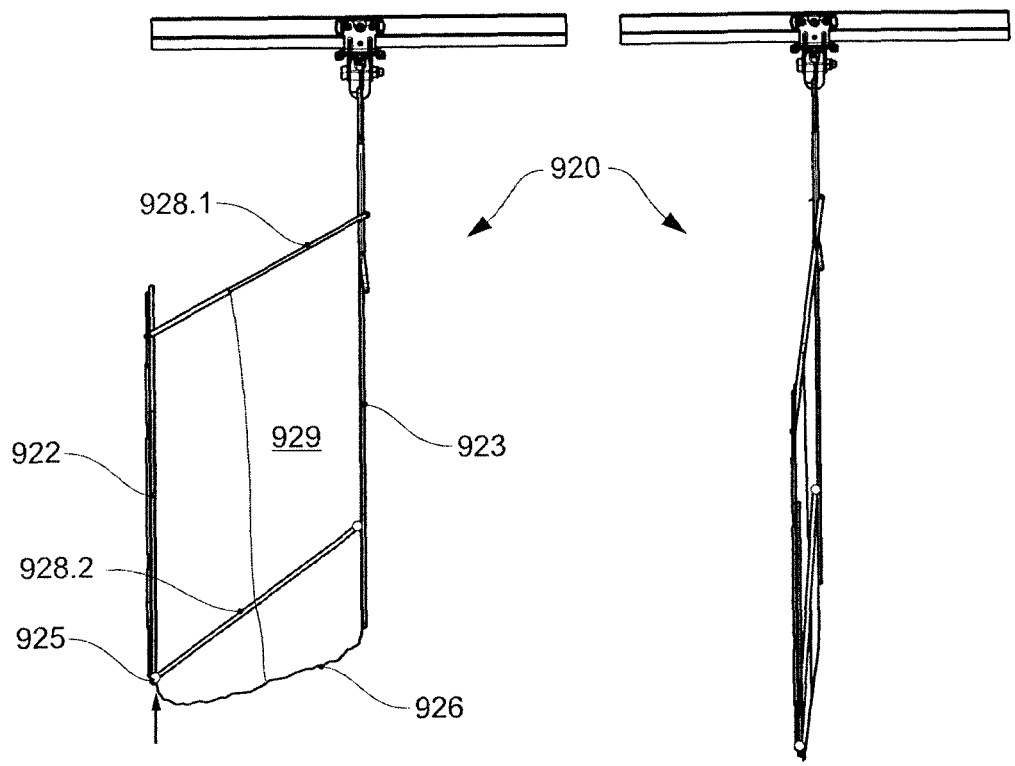
FIG. 9a a further embodiment of a transport bag in a side view in the open state.
FIG. 9b the transport bag according to FIG. 9a in the empty, closed state.

In FIG. 9, a transport bag 920 according to a further embodiment is illustrated, which corresponds largely to the embodiment according to FIG. 4 in which two spacers 928.2 are pivotally movably arranged at both sides on the lower edge 925 of the front bag wall 922, which spacers extend approximately parallel to the two upper spacers 928.1 and act on the rear wall 923 in a pivotally movable manner by means of a respective second, rear end. Although the side walls 929 and the base are manufactured from a flexible foil, textile or mesh material, the two additional spacers result in a high level of movement precision during the opening and closing of the bags.

A further embodiment of the transport bags is shown in FIG. 10. The transport bag 1020 in turn corresponds largely to the embodiment according to FIG. 4, wherein the two lower edges of the front and rear wall 1022, 1023 are now connected to one another here by a respective flexible strip 1090, preferably made from spring sheet metal, arranged laterally inside the bag. The two sheet metal strips result in the lower regions of the bag front and rear wall also being moved apart upon the opening of the bags, so that the front and rear wall are approximately parallel to one another during the opening procedure.

Figure 11B:
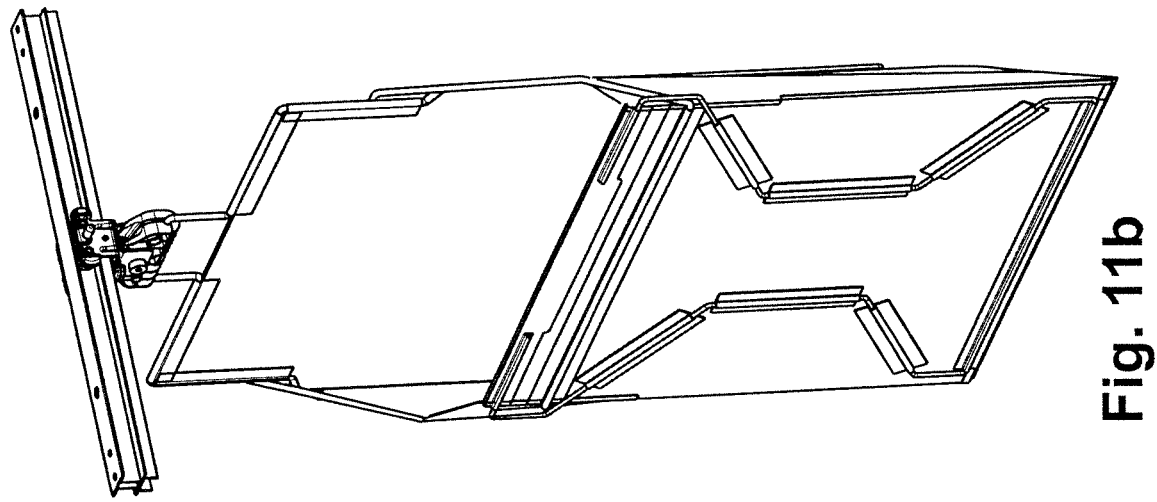
FIG. 11b the transport bag according to FIG. 11a in the empty, closed state.
Figure 11A:
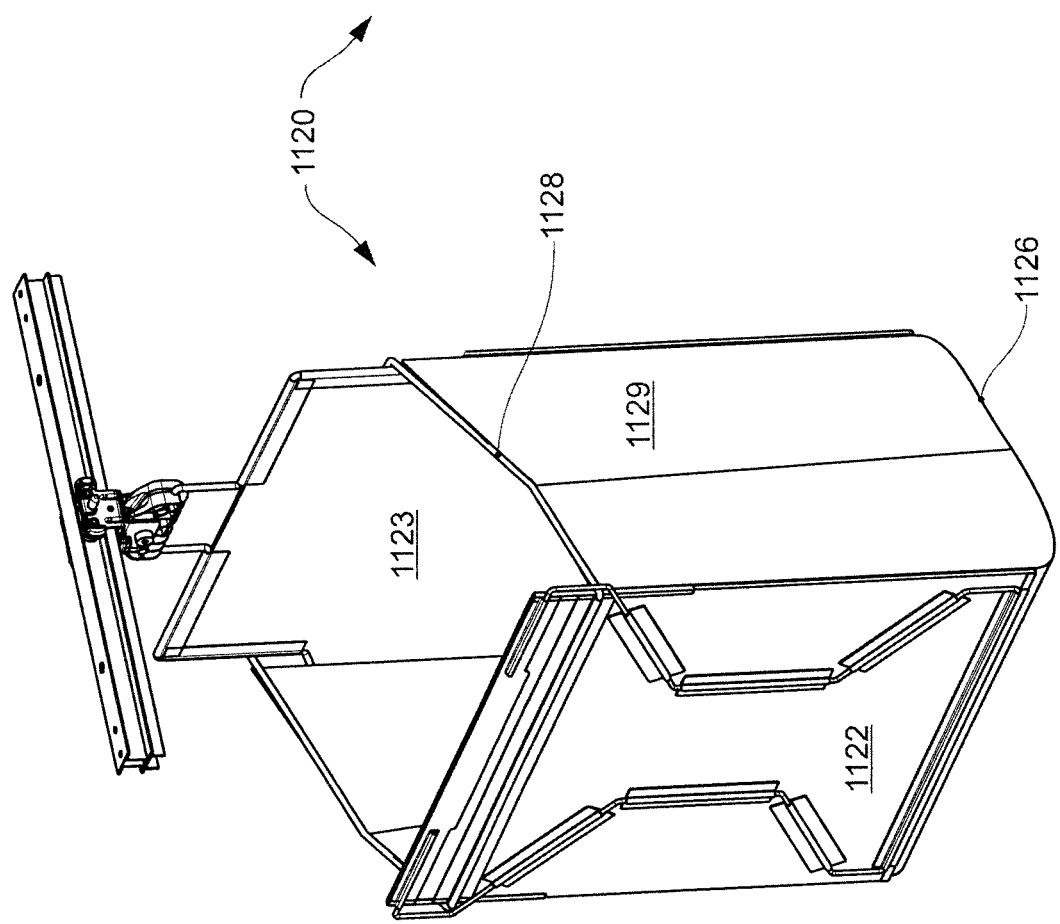
FIG. 11a a further embodiment of a transport bag in a perspective view in the maximally open state.

In FIG. 11, a transport bag 1120 is illustrated in a perspective view, which transport bag corresponds substantially to the type in FIG. 4. The push element here comprises a respective frame construction, which is stable under pushing, on the front and rear wall 1122, 1123, which are in turn connected to one another via a pivotally movably mounted spacer element 1128. The side walls 1129 and base 1126 are produced from a flexible textile or foil material.

The person skilled in the art understands that, upon the application of the pushing force to the lower edge of the front wall, the carriage must be fixed in place, braked or at least moved in a controlled manner to result in the opening of the bag and not simply in the displacement of the transport carriage with the bag closed. This applies essentially to all types and embodiments of the transport bags, irrespective of the configuration of the push element. The necessary control over the movement of the transport system and its synchronization with the push device is realized by a control device.

In FIGS. 12 and 13, preferred ways of mounting the transport bags on the transport system, in particular on the carriages, will be discussed in more detail with reference to further embodiments.

CH0110/17 by the applicant describes devices and methods for rotating, opening and filling transport bags conveyed in a suspended manner, which, with a closed or closable suspension eye, are mounted on an likewise closed or closable carrying eye of a conveyor element, in particular a carriage or a conveyor chain element, in a suspended manner. The carrying eyes are configured in such a way that the suspension eye can assume at least two stable positions in the carrying eye, wherein the suspension eye in a first stable position is rotated through an angle in relation to the suspension eye in a second stable position.

Figures 12A, 12B, 12C:
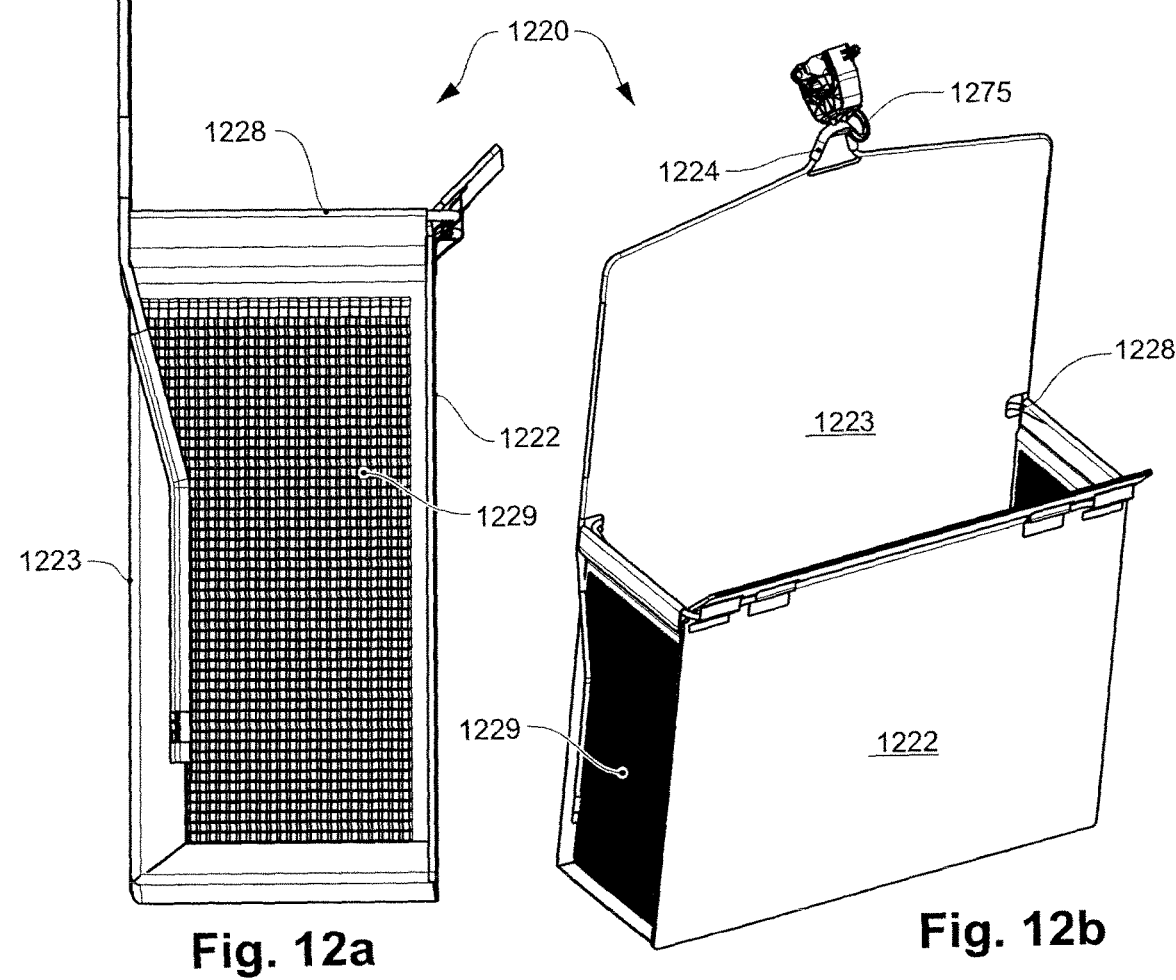
FIG. 12a a further embodiment of a transport bag in a side view in the maximally open state.
FIG. 12b the transport bag according to FIG. 10a in a perspective view.
FIG. 12c an enlargement of a detail according to FIG. 10b in the region of the counter bearing, in which upper portions of the bag rear wall are illustrated with a suspension eye and the carrying eye arranged on a conveyor element.

In FIGS. 12a and 12b, such a transport bag 1220 is illustrated in a lateral and in a perspective view. It has a suspension eye 1224, which in a carrying eye 1275 of a carriage of a gravity-type suspension conveyor arrangement, analogously to the arrangement as disclosed, for example, in WO 2016/030275A1 by the applicant. The running rail and further elements of the conveyor system are not illustrated.

The transport bag comprises a front wall 1222, a base portion 1226 and a rear wall 1223, which are pivotally connected to one another at the mutually abutting edges. The front wall, rear wall and base are configured to be stable under pushing and can be manufactured, for example, from a suitable plastic material, for example a hollow chamber plate. Flexibly configured side walls 1229 connect the front wall, rear wall and base to result in a transport bag 1220 with an opening at the upper side. The side walls 1229 made from a flexible mesh material are configured in such a way that they can be collapsed without appreciable resistance upon the closure of the transport bag.

A pivotally attached spacer 1228 in the form of a wire bracket is arranged on both sides between the front wall 1222 and rear wall 1223. The spacer 1228 is arranged substantially parallel to the base 1226 and is the same length as the base portion. The front wall 1222 lies substantially parallel to the rear wall 1223, so that the rear wall 1223, spacer 1228, front wall 1222 and base form a parallelogram accordingly. In the unloaded state, and without the application of the pushing force, the weight of the front wall and base portion causes the front wall to sink downward so that, driven by gravity, the transport bag is transformed into a closed state, in which the front wall and rear wall lie closely together. In this configuration, the transport bag can be stored in a space-saving manner in a conveyor system in that the conveyor units carrying it are lined up flush behind one another on a running rail.

Figures 10A, 10B:
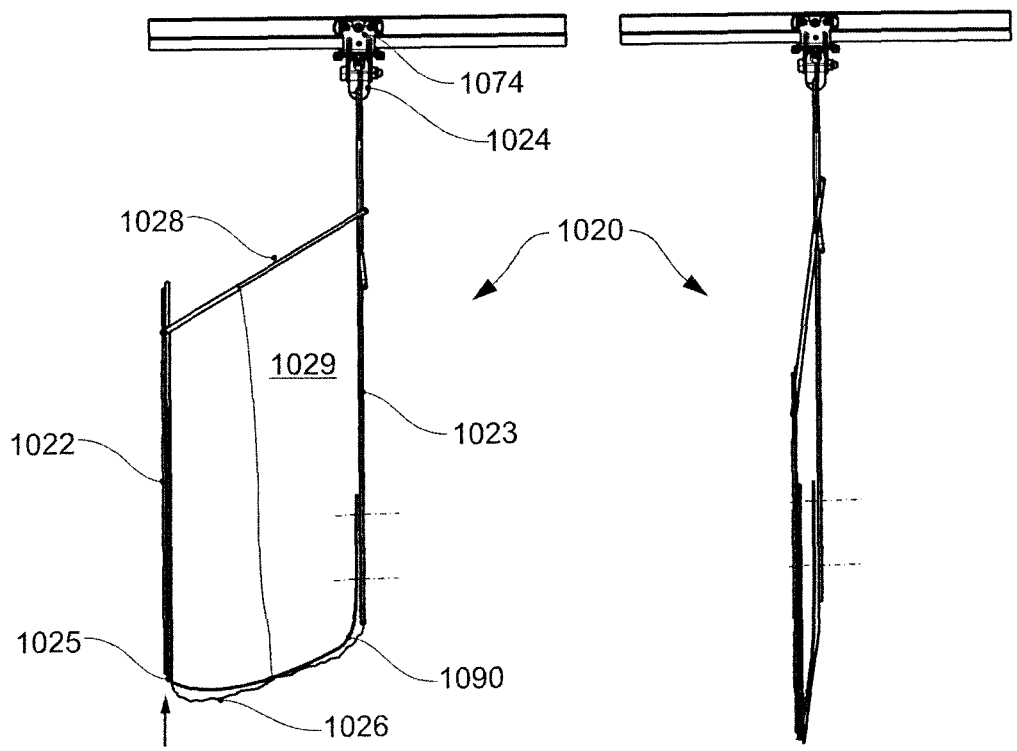
FIG. 10a a further embodiment of a transport bag in a side view in the open state.
FIG. 10b the transport bag according to FIG. 10a in the empty, closed state.

The application of a pushing force in the region of the front edge of the stable base results in the elevation of the front wall 1222 and/or the base portion in relation to the rear wall 1223. The transport bag is thus converted from the closed state into a first, unfolded state, as illustrated in FIGS. 10a and 10b. The push element is in turn formed in a parallelogram shape.

To prevent the bag from deflecting upward upon the application of the pushing force and to ensure that the pushing movement of the push device can be converted into an opening movement in a manner controlled by the push element, it has proven advantageous to delimit the upward travel of the suspension eye 1224 in the carrying eye 1275.

Figures 13A, 13B:
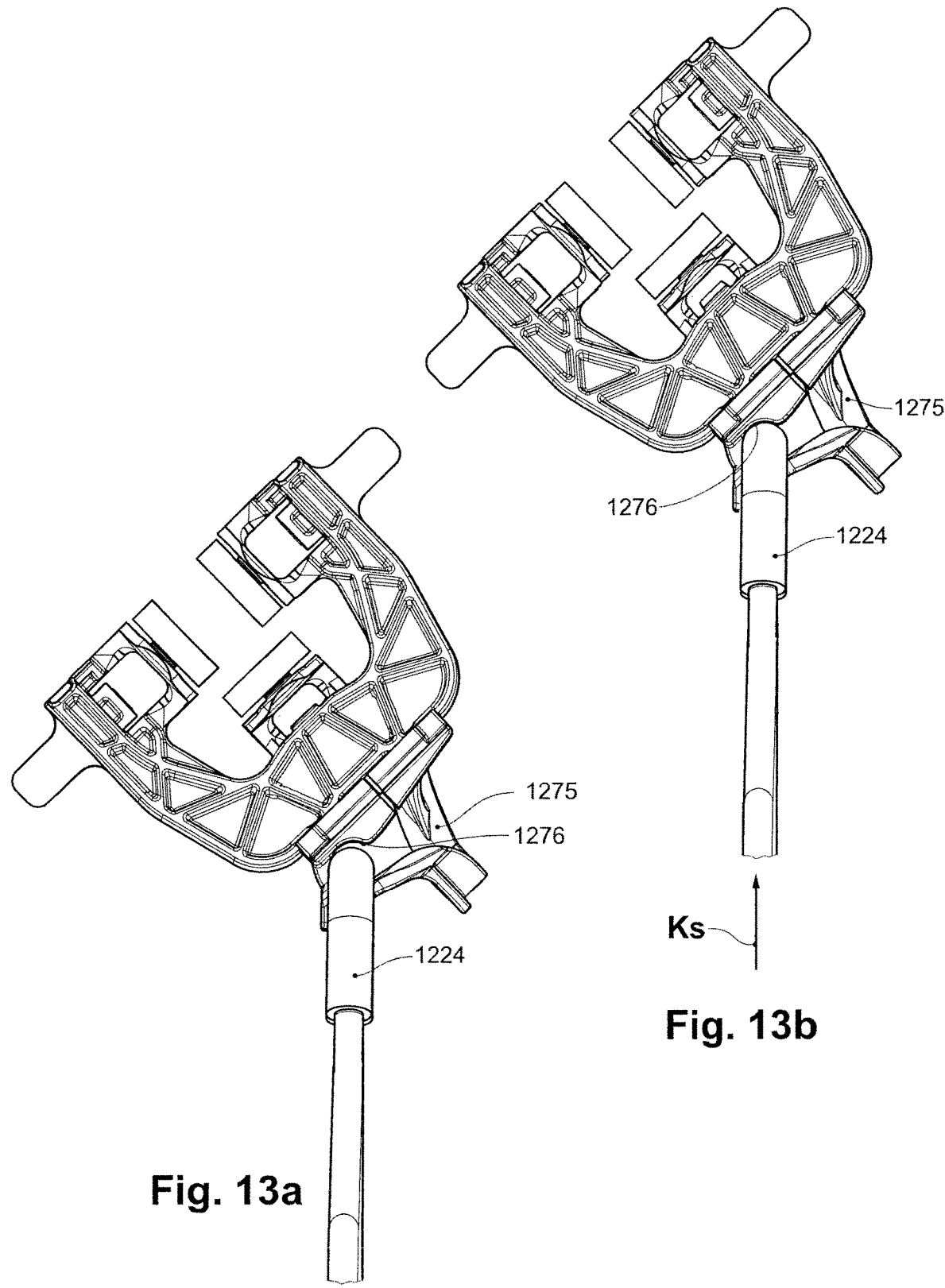
FIG. 13a a side view of the counter bearing according to FIG. 10, wherein the suspension eye, driven by gravity, is illustrated in a lower position in the carrying eye.
FIG. 13b the side view according to FIG. 11a, in which the suspension eye, subjected to a pushing force, is pressed against a locking means in the upper side of the carrying eye.

FIG. 13a illustrates an enlargement of a detail of a suspension eye 1224 of a transport bag, which is mounted in a suspended manner in a carrying eye 1275 fastened to a running carriage. The suspension eye is pulled downward by the weight of the other portions of the transport bag, which are not illustrated further in FIG. 11a, and remains idle in a first stable position in which the transport bag is aligned parallel to the conveying direction.

In FIG. 13b, the state is illustrated in which a pushing force $K_s$ is applied, which is transferred via the push element, which is likewise not illustrated further, up to the end of said push element which is in the suspension eye 1224. The suspension eye is elevated slightly and is pressed against a locking lug 1276 at the upper side of the supporting eye 1275 and reversibly fixed in this position. The locking lug 1276 prevents a deflection movement of the suspension eye 1324 in the carrying eye 1375, or reduces this to a minimum. The conversion of the pushing movement into the opening movement can therefore be controlled very precisely.

If the movement of the suspension eye 1324 in the carrying eye 1375 is not restricted to this extent, the pushing movement, which is imparted via the push element, can also be used to elevate the bag.

According to a further embodiment, the new bag comprises, at the front bag wall, a flap which can be folded forward in a funnel shape and thereby facilitates the filling procedure.

The conveyor means is preferably temporarily fixed in position or stopped when the pushing force is in effect for opening the transport bag.

The invention claimed is:

1. A method for opening a transport bag for loading and/or unloading, the method comprising:
conveying the transport bag along a conveying path by a conveyor system, in a suspended manner, to an opening device for opening the transport bag, wherein the transport bag has a front wall and a rear wall and is equipped with a movable push element which effects a relative movement of the front wall and the rear wall with respect to one another between a closed bag state and an open bag state;
exerting a pushing force from an actively moved push device on a first end of the push element of the transport bag, wherein the pushing force is exerted on the first end of the push element in a direction toward a carriage of the transport bag that is connected to the conveying path; and
converting the push element from an idle conformation into a conformation subjected to the pushing force, whereby the front wall and the rear wall are moved relative to one another in the direction of an open bag state.

2. The method as claimed in claim 1, further comprising holding the transport bag on the conveyor system in such a way that the conveyor system forms a counter bearing with respect to the pushing force exerted by the push device in that a second end of the push element acts on the counter bearing.

3. The method as claimed in claim 2, further comprising reducing a distance between the first end of the push element and the second end of the push element, owing to the application of the pushing force, which acts on the counter bearing, wherein the longitudinally stable push element is converted into a conformation subjected to a pushing force and thereby moves the front wall and the rear wall relative to one another in the direction of the open bag state.

4. The method as claimed in claim 3, further comprising holding the transport bag in an open bag state by the push device for a time required for loading and/or unloading, wherein the time is determined by a control device.

5. The method as claimed in claim 1, wherein the transport bag remains idle in an open bag state during loading and/or unloading or is conveyed further by the conveyor device, wherein the push device is moved with it accordingly.

6. The method as claimed in claim 1, wherein the transport bag, which is supplied in a suspended manner, is opened by the push device and, before, during or after this, is pivoted from the suspended position into a delivery position.

7. A device for opening transport bags conveyed along a conveying path in a conveyor system, in particular in a suspended manner, the device comprising:
an actively moved push device and at least one transport bag with an opening at the upper side, which has a base, a front wall and a rear wall and a push element connecting the two walls, wherein the push element has a first end for the action of a push device and a second end, which acts on a counter bearing formed by the conveyor system, so that, upon the application of a pushing force exerted by the push device on the first end of the push element and in a direction toward a carriage of the transport bag that is connected to the conveying path, a relative movement of the front wall and the rear wall with respect to one another between a closed bag state and an open bag state is affected.

8. The device as claimed in claim 7, wherein the push element is longitudinally stable and comprises one of at least one jointed rod with at least one torque joint, and at least one flexible pole or link chain which is stable under pushing.

9. The device as claimed in claim 8, wherein the push element comprises one of at least two jointed rods in a parallelogram shape, which are connected to one another in a jointed manner, and at least one jointed rod with two torque joints.

10. The device as claimed in claim 8, wherein the flexible pole or link chain, which is stable under pushing, is axially movably guided in a channel, wherein the channel has at least one break so that, upon the application of a pushing force, a deflection of the push element in the region of the break results in a relative movement of the front wall and the rear wall with respect to one another and therefore to the opening of the bag.

11. The device as claimed in claim 7, wherein the push element is arranged laterally on the transport bag, on both sides.

12. The device as claimed in claim 7, wherein the push element comprises portions of the front and/or rear wall which are stable under pushing.

13. The device as claimed in claim 12, wherein the portions of the front and rear wall which are stable under pushing are connected to one another by a pivotally movable spacer.

14. The device as claimed in claim 7, wherein the push device has a pusher cooperating with the first end of the push element, and the first end of the push element is formed as a push edge.

15. The device as claimed in claim 7, further comprising a control device for adapting the conveying speed of the transport bag conveyed by the conveyor system and the speed of the pushing movement of the actively moved push device to one another so that the opening width and duration of the transport bag can be individually determined.

16. The device as claimed in claim 7, further comprising a feed device for feeding goods, into the open transport bag.

17. The device as claimed in claim 7, wherein the push device comprises a revolving conveyor belt with a plurality of pushers arranged thereon.

18. The device as claimed in claim 17, wherein a direction of extent of the conveyor belt is adapted to a direction of extent of the conveyor system so that the transport bag is pivoted into a delivery position before, during or after the opening procedure.

19. A transport bag for a device as claimed in claim 7, further comprising a front wall and a rear wall and a movable push element, wherein the push element has a first end for the action of a push device and a second end, which acts on a counter bearing formed by the conveyor system, so that, upon the application of a pushing force exerted by a push device on the first end of the push element, a relative movement of the front wall and the rear wall with respect to one another between a closed bag state and an open bag state can be effected.

20. The transport bag as claimed in claim 19, wherein the push element comprises a carrying portion for attachment to a conveyor element of the conveyor system in a manner which is stable under pushing.

21. The transport bag as claimed in claim 19, wherein bag walls, which are stable under pushing, are manufactured from plastic hollow profile plates, which are connected to one another by at least one pivotally movably mounted spacer element which is stable under pushing.

22. The transport bag as claimed in claim 19, wherein the push element comprises at least one joint.

23. The transport bag as claimed in claim 19, wherein the rear wall of the transport bag is extended upward beyond the height of the front wall with a carrying portion for the attachment of the transport bag to the conveyor element, wherein the attachment is at least pivotally movable and takes place via a suspension.

24. A device for opening transport bags conveyed along a conveying path in a conveyor system, in particular in a suspended manner, the device comprising:

an actively moved push device and at least one transport bag with an opening at the upper side, which has a base, a front wall and a rear wall and a push element connecting the two walls, wherein the push element has a first end for the action of a push device and a second end, which acts on a counter bearing formed by the conveyor system, so that, upon the application of a pushing force exerted by the push device on the first end of the push element, a relative movement of the front wall and the rear wall with respect to one another between a closed bag state and an open bag state is affected, wherein the push device has a pusher cooperating with the first end of the push element, and the first end of the push element is formed as a push edge, wherein the pusher comprises at least one of a push plate, a push rib and one or more push fingers.

* * * * *